(No Model.)

W. P. WALTER.
FLUE STOPPER.

No. 391,870. Patented Oct. 30, 1888.

Witnesses,
W. D. Porter,
Fred F. Church.

Inventor,
Wm. P. Walter.
By his Attorney
Herbert W. T. Jenner.

UNITED STATES PATENT OFFICE.

WILLIAM PENN WALTER, OF NEWTON, KANSAS.

FLUE-STOPPER.

SPECIFICATION forming part of Letters Patent No. 391,870, dated October 30, 1888.

Application filed March 22, 1888. Serial No. 268,150. (No model.)

*To all whom it may concern:*

Be it known that I, WILLIAM PENN WALTER, a citizen of the United States, residing at Newton, in the county of Harvey and State of Kansas, have invented certain new and useful Improvements in Flue-Stoppers; and I do hereby declare the following to be a full, clear, and exact description of the invention, such as will enable others skilled in the art to which it appertains to make and use the same.

This invention relates to flue-stoppers; and it consists in the novel construction and combination of the parts hereinafter fully described and claimed.

Figure 1:
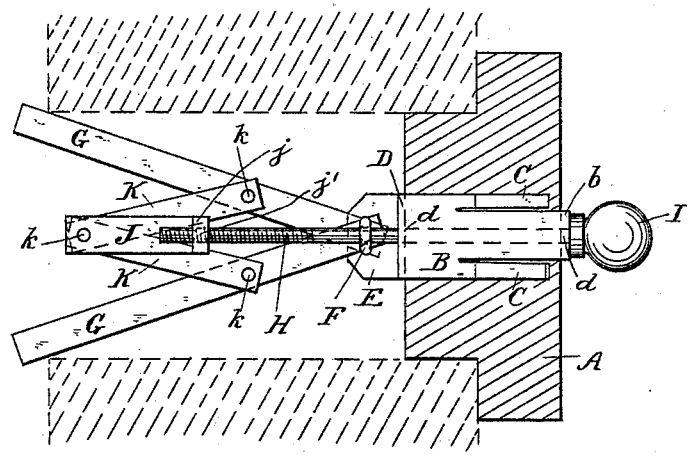
Figure 2:
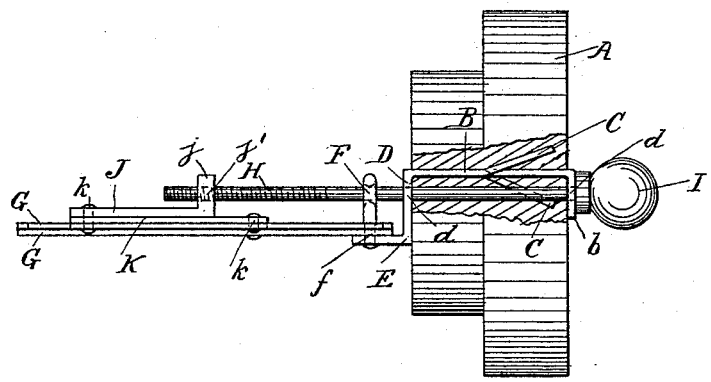

In the drawings, Figure 1 is a plan view from above, showing the stopper-disk in section. Fig. 2 is a side view showing the stopper-disk partly in section.

A is the stopper-disk which closes the hole in the wall after the stove-pipe has been taken down. This stopper-disk is made of plaster-of-paris or any other similar material which is appropriate for the purpose.

B is a plate, one end of which is turned down, forming the flange $b$. The plate is split upon each side of this flange and bent in opposite directions, forming the tangs C, which are embedded in the said plaster disk. The other end of plate B is also bent down, and has its extreme end bent again parallel with the plate, thus forming the vertical flange D and the horizontal flange E.

F is an eyebolt riveted into the flange E, and having the arms G pivoted upon its stem $f$ between the eye and the said flange.

H is a screw which passes through the eyebolt F, and is journaled in the holes $d$, formed through the vertical flanges $b$ and D of the plate B. A knob, I, is secured upon the end of the screw H, outside the stopper-disk, for rotating the screw and working the retaining-arms G.

J is a plate provided with the vertical flange $j$, having a screw-threaded hole, $j'$, with which the screw H may engage.

K are links which are pivotally connected to the end of plate J and to the arms G by the pins $k$.

The stopper is applied to the hole in the wall when the arms G are near together and can pass through the hole, and the screw is then revolved by means of the knob. The revolution of the screw draws upon the plate J, which forces the arms G apart by means of the links K until the said arms hold the stopper-disk securely fastened in the hole, as shown in Fig. 1 of the drawings. The revolution of the screw in the opposite direction will draw the retaining-arms together and release the stopper-disk.

It will be seen that this device is extremely simple and efficient, and that it is very cheaply made on account of having so few parts, and those being of a very simple nature.

What I claim is—

1. The combination, with a stopper-disk, of a plate embedded in the disk and provided with vertical flanges at each end, a screw journaled in the said vertical flanges and provided with a knob for rotating it, the retaining-arms pivoted at one end to the said plate, a sliding plate provided with a vertical flange having a screw-threaded hole engaging with the said screw, and the links pivotally connecting the said arms and sliding plate, substantially as set forth.

2. The combination, with a stopper-disk, of a plate secured in the disk and provided with vertical flanges, a screw journaled in the said vertical flanges and provided with a knob for rotating it, the retaining-arms pivoted to the said plate, and a sliding plate engaging with the said screw and operatively connected with the retaining-arms, substantially as set forth.

3. The combination, with a stopper-disk, of a plate provided with tangs securing it in the disk, the vertical flanges at each end, and the horizontal flange E, a screw provided with a knob at one end and journaled in the said vertical flanges, the retaining-arms pivoted at one end to the said horizontal flange, a sliding plate provided with a screw-threaded hole engaging with the said screw, and the links pivoted to the retaining-arms and to the said sliding plate, substantially as set forth.

4. The combination, with a plaster flue-stopper disk, of a plate provided with tangs embedded in the disk, the vertical flanges at each end, and the horizontal flange E, an eyebolt riveted in the said horizontal flange, the retaining-arms pivoted upon the stem of the said eyebolt, the screw provided with a knob at one end, journaled in the said vertical flanges and passing through the eye of the eyebolt, the sliding plate provided with a screw-threaded hole engaging with the said screw, and the links pivoted to the sliding plate and to the retaining-arms, substantially as set forth.

In testimony whereof I affix my signature in presence of two witnesses.

WILLIAM PENN WALTER.

Witnesses:
S. J. BENTLEY,
L. R. YEAGER.